United States Patent
Kato

[11] Patent Number: 5,995,081
[45] Date of Patent: *Nov. 30, 1999

[54] HANDWRITING TYPE INPUT DISPLAY DEVICE

[75] Inventor: Kiyoshi Kato, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,807

[22] Filed: Jan. 10, 1997

[30] Foreign Application Priority Data

Jan. 12, 1996 [JP] Japan ................................. 8-021709

[51] Int. Cl.$^6$ ................. G08C 21/00; G09G 5/00; G09G 1/00
[52] U.S. Cl. ................. 345/156; 345/174; 345/180; 178/18.01; 178/18.03; 178/19.01
[58] Field of Search .................... 345/156, 173, 345/174, 179, 180; 178/18.01, 18.03, 19.01; 382/116, 160, 181, 187, 188, 189, 190, 228

[56] References Cited

U.S. PATENT DOCUMENTS

| | | | |
|---|---|---|---|
| 4,866,646 | 9/1989 | Nakamura | 364/709.11 |
| 5,294,792 | 3/1994 | Lewis et al. | 345/180 |
| 5,459,809 | 10/1995 | Kim et al. | 382/160 |
| 5,467,407 | 11/1995 | Guberman et al. | 382/187 |
| 5,698,822 | 12/1997 | Haneda et al. | 382/189 |

FOREIGN PATENT DOCUMENTS

| | | |
|---|---|---|
| 2-077825 | 3/1990 | Japan . |
| 5-159036 | 6/1993 | Japan . |
| 6-012493 | 1/1994 | Japan . |
| 6-289993 | 10/1994 | Japan . |

*Primary Examiner*—Vijay Shankar
*Attorney, Agent, or Firm*—Foley & Lardner

[57] ABSTRACT

A handwriting type input display device is provided with a display device for performing a two-dimensional display, an input device which constitutes a handwriting device in combination with the display device, and is adapted to detect a handwriting input operation by a user at a coordinate position corresponding to a position on a screen of the display device, a passing point predicting device for receiving the coordinate point sequence from the input device to insert a new coordinate point sequence between neighboring coordinate points of the coordinate point sequence, and outputting a coordinate point sequence for forming a smooth handwritten curved line, and a processing device for instructing an insertion method of coordinate points to the passing point predicting device, and performing processing of displaying on the display device a curved line based on the coordinate point sequence which is obtained by the passing point predicting device.

11 Claims, 11 Drawing Sheets

100, 101, 102, 103 ···· DETECTED COORDINATE POINT
200 ···· AVERAGE SPEED VECTOR
201 ···· AVERAGE ACCELERATION VECTOR
300 ···· DIVISIONAL COORDINATE POINT SEQUENCE
301 ···· INTERPOLATIVE COORDINATE POINT SEQUENCE
400 ···· LOCUS AFTER INTERPOLATION 100, 101, 102, 103, 104 ··· DETECTED COORDINATE POINT
202, 204, 206 ··· SPEED VECTOR
203, 205, 207 ··· ACCELERATION VECTOR
208 ··· SHIFT VECTOR
302 ··· PREDICTED COORDINATE POINT
500 ··· DISPLACEMENT

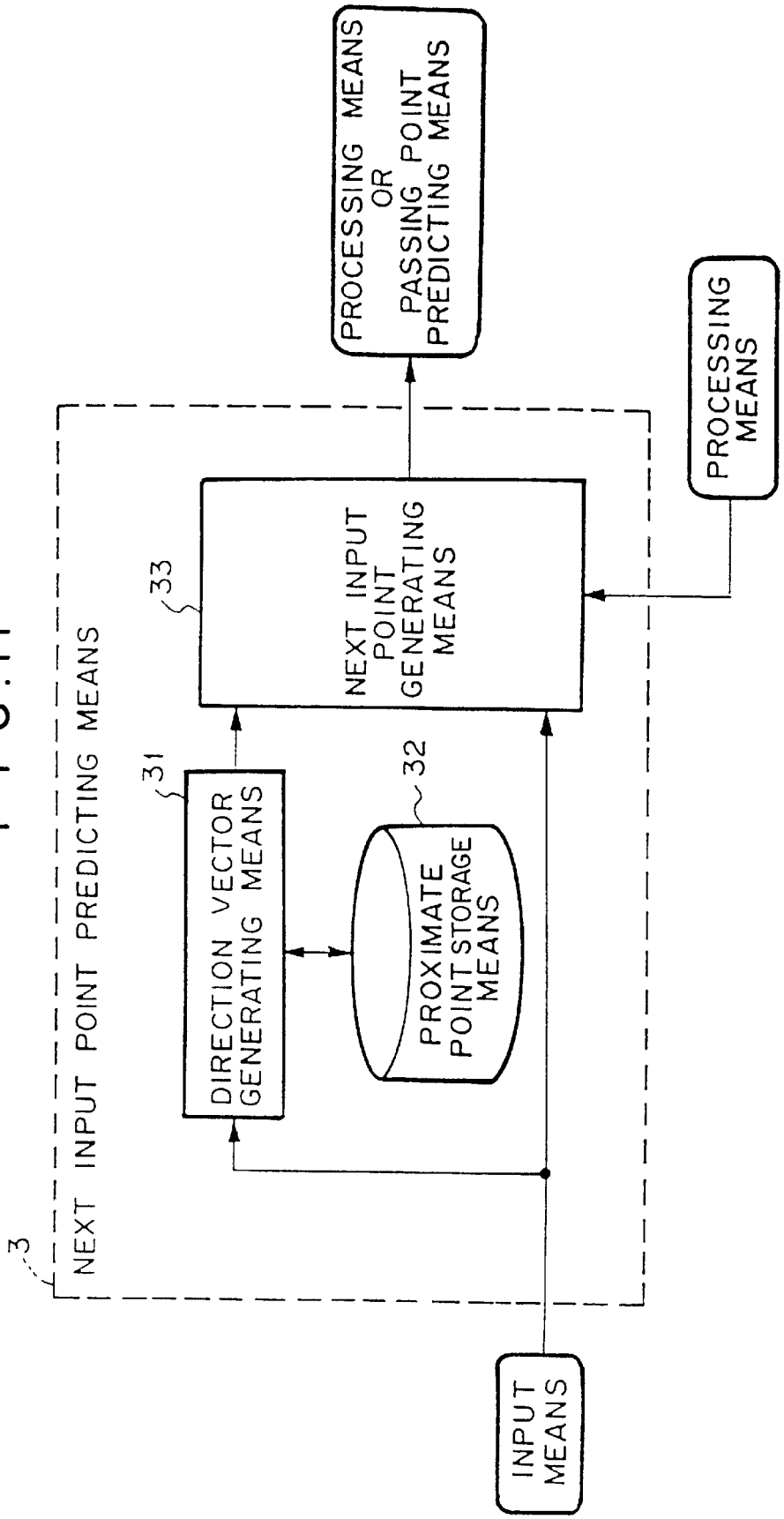

HANDWRITING TYPE INPUT DISPLAY DEVICE

BACKGROUND OF THE INVENTION

1. Field of the Invention

The present invention relates to a user interface technique for an information processing device, and particularly to a handwriting type input display device according to a handwriting input display technique in which "operability of paper and pen" (which is defined as the same operability as performed by handwriting information on physical paper with a physical pen) is achieved by an information processing device.

2. Description of the Related Art

A handwriting type input display device to achieve "operability of paper and pen" has been hitherto utilized as a user interface for a general user because it can be easily operated by even an user who is unfamiliar with the operation of the information processing device. However, since such a conventional handwriting type input display device cannot sufficiently reproduce "the operability of paper and pen", there is a problem that the operational load imposed on the user is large and thus the operation efficiency of the user is low.

This problem will be described in detail by considering some specific prior art.

As a first prior art, there is known a handwriting type input display device such as a pen computer or a pen electronic pocketbook in which the coordinate value of a coordinate point detected by coordinate input means (corresponding to input means shown in FIGS. 1 to 3) such as a touch panel or the like is interpreted by processing means, and then a response display based on the interpretation is performed by display means such as LCD (Liquid Crystal Display) or the like.

In such a handwriting type input display device, there is a time delay from the time when a user performs his handwriting input operation until the time when a response display to the handwriting input operation is actually performed by the display means, and thus the user must carry out his handwriting input operation while considering that a curved line which does not appear at the input time (a curved line which is not displayed on the screen of the display means) will be displayed in time. This consideration would put mentally and realistically heavy operational load on the user. In addition, since the sampling interval of the coordinate input means is generally longer than the speed of the handwriting operation which is daily carried out by the user, a curved line which is handwritten by the user is actually broken in a response display step even by smoothly shifting a pen. Therefore, in order for the user to draw a curved line accurately, he must slowly shift the pen in consideration of the sampling interval, which causes the operation efficiency of the user to be reduced.

In the specification, an equipment to be held by an user to perform the handwriting input is called as "pen" (even if another name is provided to an equipment having the same function, the equipment is assumed to be covered by the concept of "pen").

As a second prior art, there is a handwriting input display device disclosed in Japanese Laid-open Patent Application No. Hei-6-289993. In order to solve the problem of the time delay of the response display in the first prior art, according to the second prior art, the coordinate value of a coordinate point which is predicted as a coordinate point to be input next is generated on the basis of the sequence of coordinate points (hereinafter referred to as a coordinate point sequence) obtained by coordinate input means, and then the response display of the coordinate point thus predicted is performed earlier by the delay time. If the position error (displacement) between the predicted coordinate point and the actually input coordinate point is large, the response display of the predicted coordinate point is deleted and the response display of the actually input coordinate point is performed again.

In the handwriting type input display device as described above, it is difficult to perform an accurate prediction on the basis of the sequence of the coordinate points which are obtained by the coordinate input means having a long sampling interval. In addition, the processing time is wasted because the response display must be carried out while repeating the deletion of predicted coordinate points which do not meet the actually input coordinate points as described above, and thus it is impossible to perform a continuous response display along a handwritten locus of a pen. This causes a user to be confused in the course of his handwriting operation, resulting in reduction of the operation efficiency.

As described above, in the above-described handwriting type input display devices, there are some problems that the operational load on the user is large and that the operation efficiency is low. That is, as described above, the first prior art has the problem that the operation load on the user is large because the response display to the handwriting input operation has a time delay, namely, time lag. The first prior art also has the problem that the operation efficiency of the user is low because the sampling interval of the coordinate input means is long. Furthermore, the second prior art has the problem that the processing time is wasted by the retrial of the response display for the deletion of a predicted coordinate point and it is impossible to perform a continuous response display along a locus of a pen, so that the operation efficiency of the user is reduced.

SUMMARY OF THE INVENTION

In view of the foregoing problems of the prior art, an object of the present invention is to provide a handwriting type input display device which can reduce the operational load on a user and also enhance the operation efficiency of the user.

In order to attain the above object, according to a first aspect of the present invention, a handwriting type input display device is characterized by comprising display means for performing a two-dimensional display, input means which constitutes handwriting means in combination with the display means, and is adapted to detect a handwriting input operation by an user at a coordinate position corresponding to a position on a screen of the display means, passing point predicting means for receiving the coordinate point sequence from the input means to insert a new coordinate point sequence between neighboring coordinate points of the coordinate point sequence, and outputting a coordinate point sequence for forming a smooth handwritten curved line, and processing means for instructing an insertion method of coordinate points to the passing point predicting means, and performing processing of displaying on the display means a curved line based on the coordinate point sequence which is obtained by the passing point predicting means.

According to a second aspect of the present invention, a handwriting type input display device is characterized by comprising display means for performing a two-dimensional display, input means which constitutes handwriting means in combination with the display means, and is adapted to detect a handwriting input operation by an user at a coordinate position corresponding to a position on a screen of the display means, next input point predicting means for generating predicted coordinate points for each coordinate point which is received from the input means to reduce a delay time from the time when an user performs a handwriting input operation until the time when a response display is performed, and processing means for instructing a calculation method for generating the predicted coordinate points to the next input point predicting means, and performing processing of displaying on the display means a curved line based on a coordinate point sequence which is obtained from said next input point predicting means.

According to a third aspect of the present invention, a handwriting type input display device is characterized by comprising display means for performing a two-dimensional display, input means which constitutes handwriting means in combination with the display means, and is adapted to detect a handwriting input operation by an user at a coordinate position corresponding to a position on a screen of the display means, next input point predicting means for generating predicted coordinate points for each coordinate point which is received from the input means to reduce a delay time from the time when an user performs a handwriting input operation until the time when a response display is performed, passing point predicting means for receiving the coordinate point sequence from the next input point predicting means to insert a new coordinate point sequence between neighboring coordinate points of the coordinate point sequence, and outputting a coordinate point sequence for forming a smooth handwritten curved line, and processing means for instructing a calculation method for generating the predicted coordinate points to the next input predicting means, instructing an insertion method of a coordinate point to the passing point predicting means, and performing processing of displaying on the display means a curved line based on a coordinate point sequence obtained from the passing point predicting means.

According to a fourth aspect of the present invention, in the handwriting type input display device as described above, the passing point predicting means comprises control vector generating means for generating an average speed vector and an average acceleration vector on two neighboring coordinate points of the received coordinate point sequence, insertion point number determining means for determining the number of insertion points between the two neighboring coordinate points on the basis of the magnitude of the average acceleration vector generated by the control vector generating means, and passing point adding means for dividing the average speed vector generated by the control vector generating means into parts whose number is equal to the insertion point number determined by the insertion point number determining means to generate a divisional coordinate point sequence, and shifting the divisional coordinate point sequence in the direction of the average acceleration vector in accordance with an instruction of the processing means.

According to a fifth aspect of the present invention, in the handwriting type input display device as described above, the passing point predicting means has continuity judgment means for judging whether the interpolative coordinate point sequence received from the passing point adding means forms a smoothly curved line, and the control vector generating means in the passing point predicting means corrects the calculation of the average speed vector and the average acceleration vector in accordance with the judgment result of said continuity judgment means.

According to a sixth aspect of the present invention, in the handwriting type input display device as described above, the next input point predicting means comprises proximate point storage means for storing a coordinate point sequence which is to be a proximate coordinate point sequence to the latest coordinate point, direction vector generating means for reading out the proximate coordinate point sequence to the latest coordinate point from the proximate point storage means to generate a speed vector and an acceleration vector at the latest coordinate point from the proximate coordinate point sequence, and next input point generating means for correcting the composite vector of the speed vector and the acceleration vector generated by the direction vector generating means in accordance with an instruction of the processing means to generate a shift vector, and shifting the latest coordinate point in the direction of the shift vector to generate a predicted coordinate point.

According to a seventh aspect of the present invention, in the handwriting type input display device as described above, the next input point predicting means has position error (displacement) judging means for detecting the position error in coordinate position between the predicted coordinate point generated by the next input point generating means and a coordinate point which is newly obtained after the prediction, and the direction vector generating means in the next input point predicting means corrects the calculation of the speed vector and the acceleration vector in accordance with the position error (displacement) detected by the position error judging means.

BRIEF DESCRIPTION OF THE DRAWINGS

FIG. 11 is a block diagram showing another embodiment of the next input point predicting means in FIGS. 2 and 3 (another embodiment of FIG. 6).

DETAILED DESCRIPTION OF THE PREFERRED EMBODIMENTS

Preferred embodiments according to the present invention will be described with reference to the accompanying drawings.

FIRST EMBODIMENT

Figure 1:
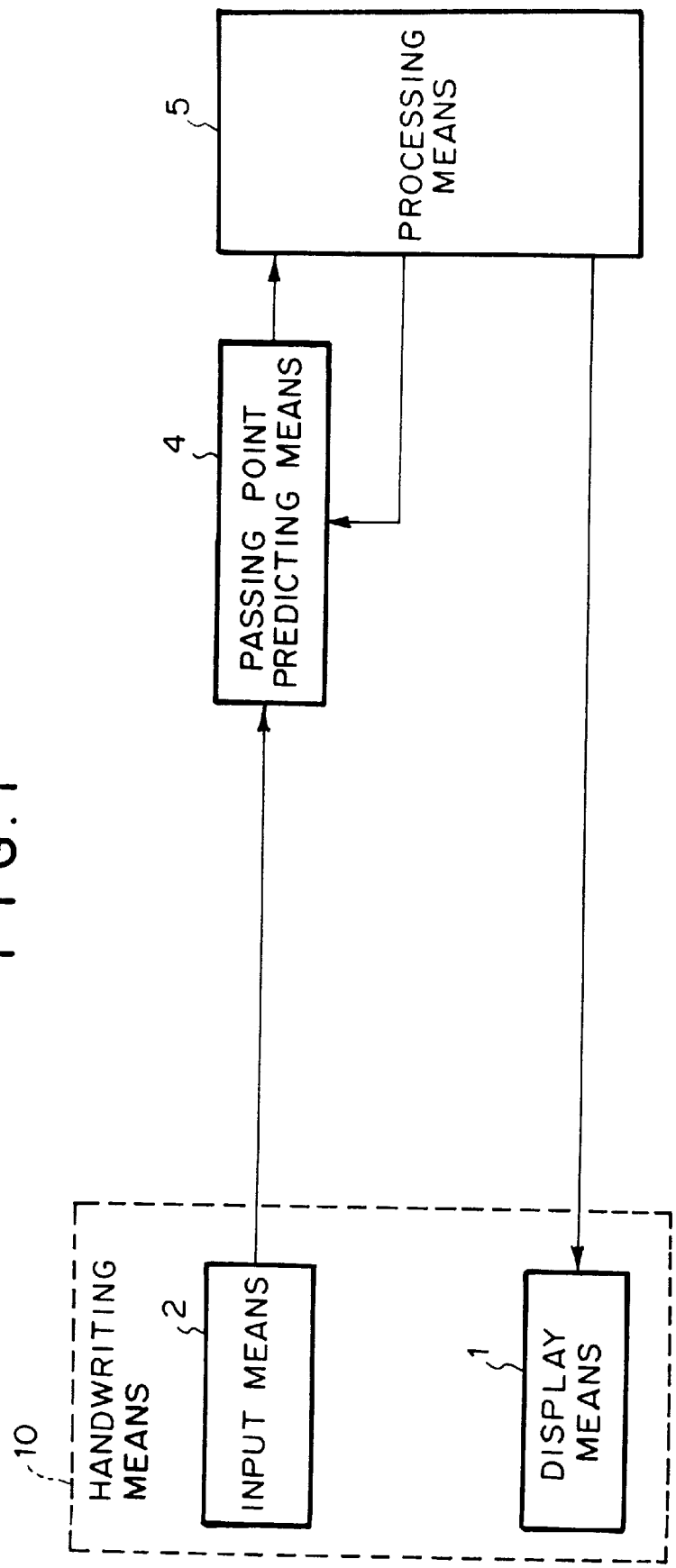
FIG. 1 is a block diagram showing the construction of a first embodiment of the present invention.

FIG. 1 is a block diagram showing the construction of a first embodiment of a handwriting type input display device according to the present invention.

The handwriting type input display device according to this embodiment includes display means 1, input means 2, passing point predicting means 4 and processing means 5. The display means 1 (for example, it may comprise an LCD (liquid crystal device)) performs a two-dimensional display. The input means 2 detects a handwriting operation by a user at the coordinate position corresponding to a position on the screen of the display means 1 (i.e., the input operation along a coordinate point sequence) to output the input data to the passing point predicting means 4. The input means preferably comprises a touch panel, a tablet (with a pen), a slide pad or the like, and it may comprise a mouse or a pen (in this case, reality is low because a locus input is performed). The display means 1 and the input means 2 constitute handwriting means 10 for achieving the "operability of paper and pen" in combination. It is preferable that the display means 1 and the input means 2 are formed integrally with each other such that semi-transparent input means 2 is laminated on the upper layer of the display means 1, thereby constituting the handwriting means 10.

In order to generate a coordinate point sequence (the sequence of coordinate points with which a smoothly curved line is to be represented), according to a method (calculation method) indicated by the processing means 5, the passing point predicting means 4 inserts a new coordinate point sequence (i.e., predicted coordinate points) between neighboring coordinate points of a coordinate point sequence which is obtained from the input means 2, and then outputs to the processing means 5 the coordinate point sequence after the new coordinate point sequence is inserted. The processing means 5 indicates the method of inserting the predicted coordinate points to the passing point predicting means 4 so as to perform the processing of displaying on the display means 1 a curved line based on the coordinate point sequence which is obtained from the passing point predicting means 4.

Figure 4:
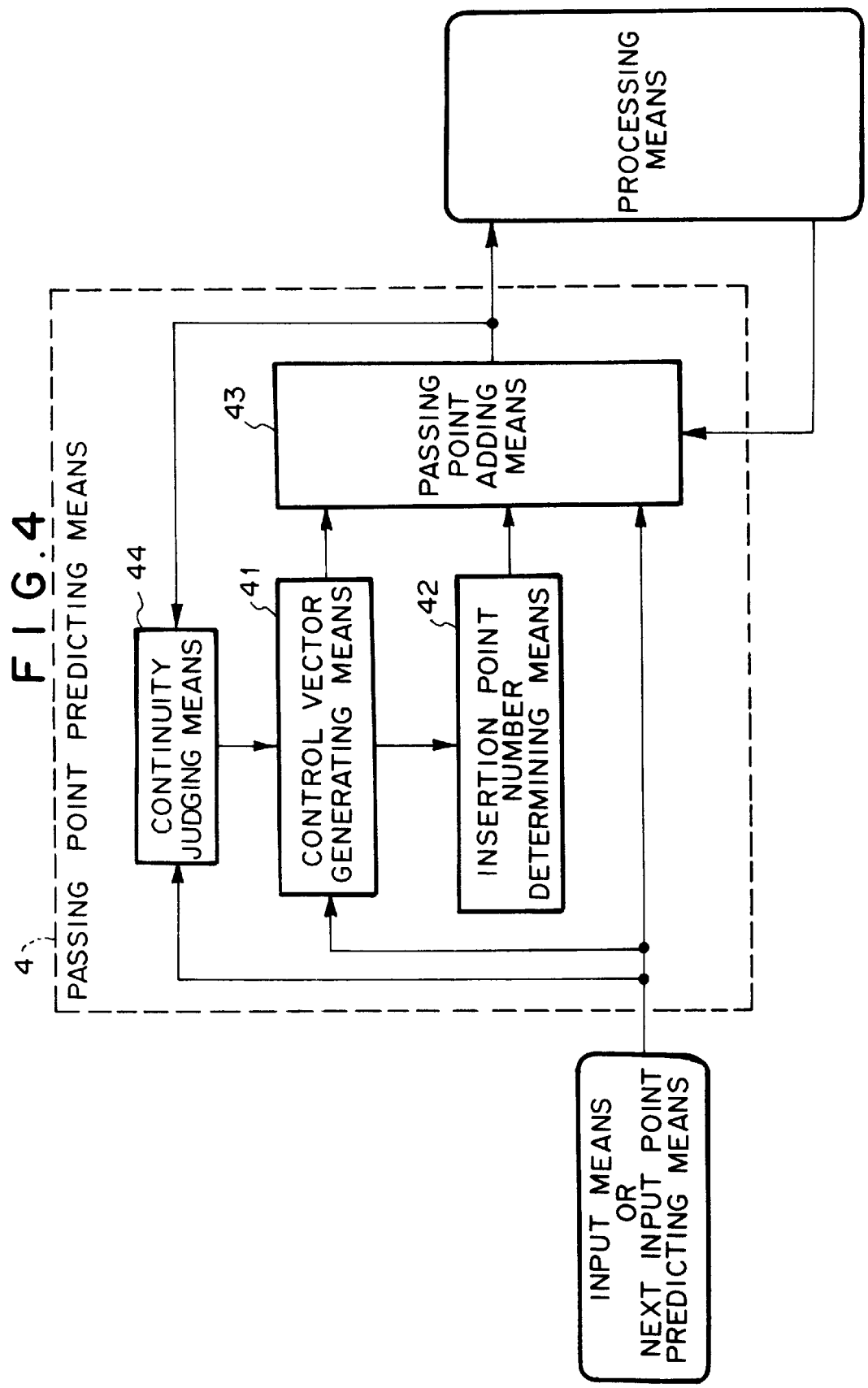
FIG. 4 is a block diagram showing the construction of passing point predicting means in FIGS. 1 and 3.

FIG. 4 is a block diagram showing the construction of the passing point predicting means 4 in the handwriting type input display device according to this embodiment ("the input means 2 or the next input point predicting means 3" in FIG. 4 means "input means 2" in this embodiment). Referring to FIG. 4, the passing point predicting means 4 in this embodiment has the following constituent elements (1) to (4) (control vector generating means 41, insertion point number determining means 42, continuity judging means 44 and passing point adding means 43).

(1) The control vector generating means 41 generates the average speed vector and the average acceleration vector of two neighboring coordinate points of a coordinate point sequence which is received from the input means 2 (as described later, this generating operation is performed in consideration of the judgment result of the continuity judgment means 44), and outputs these vectors to the insertion point number determining means 42 and passing point adding means 43.

(2) The insertion point number determining means 42 determines the number of coordinate points to be inserted between the neighboring two coordinate points on the basis of the magnitude of the average acceleration vector obtained by the control vector generating means 41, and outputs the number (insertion point number) to the passing point adding means 43.

(3) The passing point adding means 43 divides the average speed vector into parts whose number is equal to the insertion point number obtained by the insertion point number determining means 42 to thereby generate a divisional coordinate point sequence, then shifts the divisional coordinate point sequence in the direction of the average acceleration vector according to an instruction of the processing means 5 to generate an interpolative coordinate point sequence, and then outputs the interpolative coordinate point sequence to the processing means 5.

(4) The continuity judgment means 44 receives both the coordinate point sequence output from the input means and the interpolative coordinate point sequence output from the passing point adding means 43 to judge whether the interpolative coordinate point sequence provides a smoothly curved line in combination with the coordinate point sequence, and outputs the judgment result to the control vector generating means 41 (the control vector generating means 41 performs predetermined correction (alteration) processing on the method of calculating the average speed vector and the average acceleration vector in accordance with the judgment result, if necessary).

Figure 5:
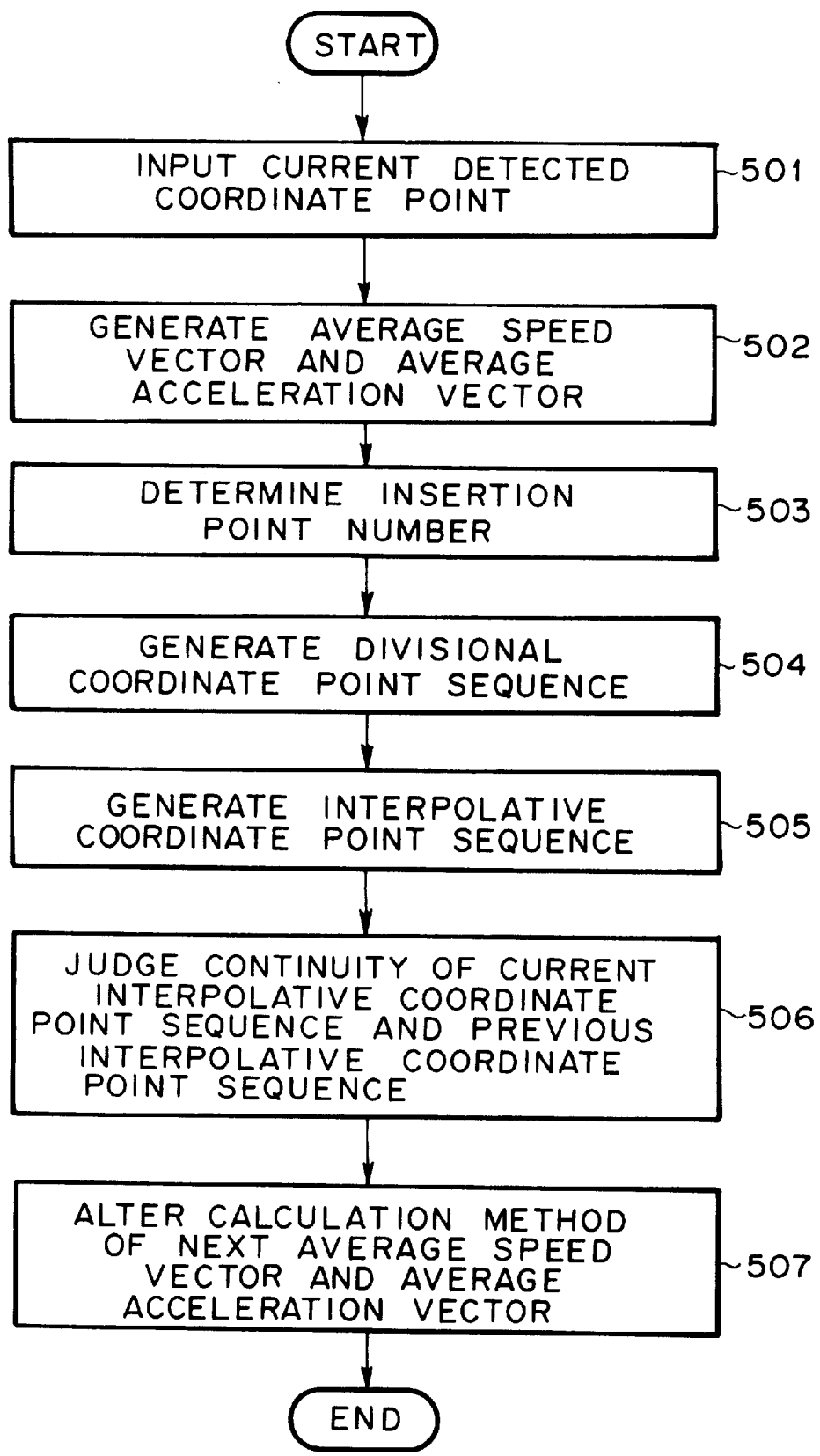
FIG. 5 is a flowchart showing the processing in the passing point predicting means shown in FIG. 4.

FIG. 5 is a flowchart showing the processing of the passing point predicting means 4 shown in FIG. 4. This processing comprises a current (present) detected coordinate point input step 501, an average vector and average acceleration vector generating step 502, an insertion point number determining step 503, a divisional coordinate point sequence generating step 504, an interpolative coordinate point sequence generating step 505, a continuity judging step 506, and a next average speed vector and average acceleration vector calculating method altering step 507.

Figure 8:
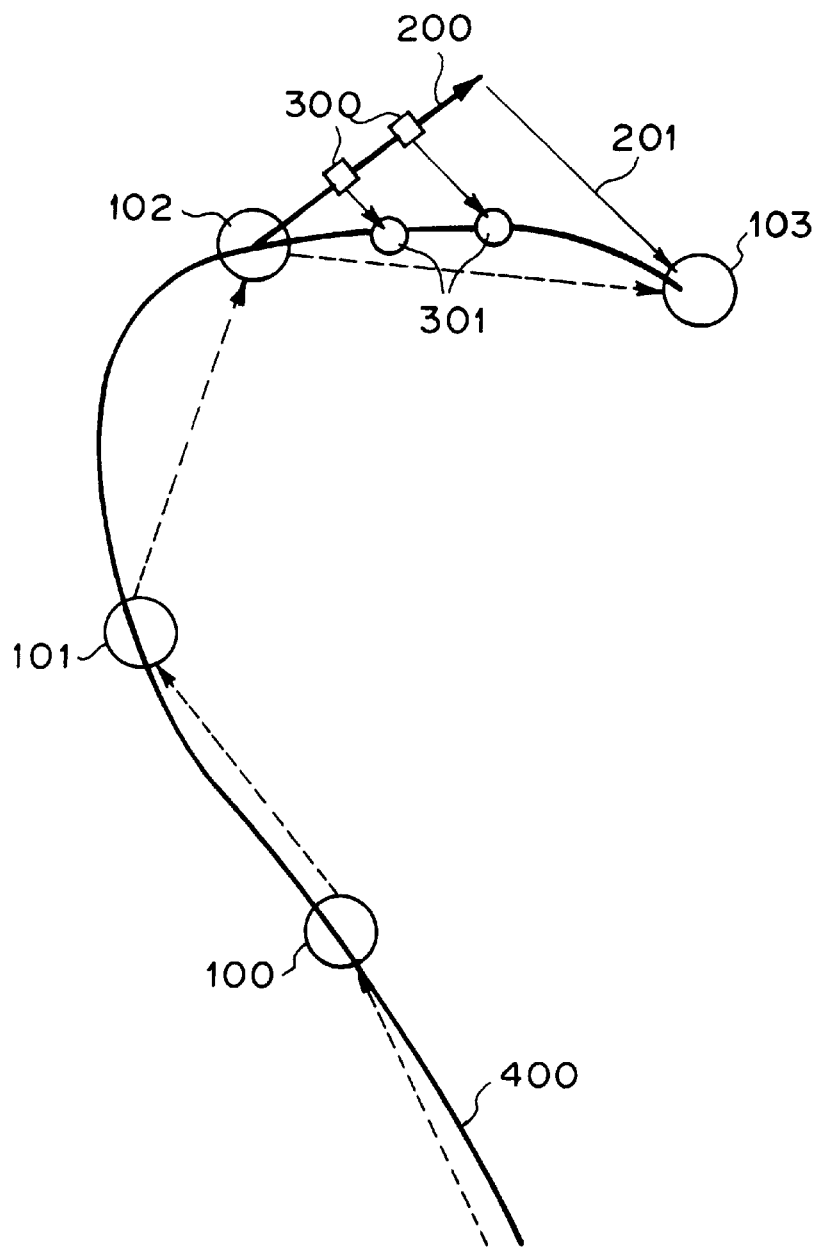
FIG. 8 is a schematic diagram showing the operation of a handwriting type input display device shown in FIGS. 1 and 3, and particularly it is a diagram showing the operation of the passing point predicting means shown in FIG. 4.

FIG. 8 is a diagram showing the operation of a handwriting type input display device according to this embodiment.

In FIG. 8, a detected coordinate point 100, a detected coordinate point 101, a detected coordinated point 102 and a detected coordinate point 103 are obtained by arranging a coordinate point sequence detected by the input means 2 in a detection order. An average speed vector 200 and an average acceleration vector 201 are vectors which are generated/output by the control vector generating means 41 when the detected coordinate point 102 and the detected coordinated point 103 are selected as "two neighboring coordinate points". A divisional coordinated point sequence 300 and an interpolative coordinate point sequence 301 are sequences which are to be inserted into an area between the detected coordinated point 102 and the detected coordinated point 103 by the passing point adding means 43.

Next, the operation of the handwriting type input display device according to this embodiment will be described with reference to FIGS. 1, 4, 5 and 8.

The input means 2 of the handwriting means 10 successively inputs coordinate points 100, 101, 102 and 103 (i.e., a coordinate point sequence) on the basis of the instruction (handwriting operation) from an user, and outputs each coordinate point (the coordinate value of each coordinate point) to the passing point predicting means 4.

In the case of FIG. 8, in the process that a detected coordinate point sequence as shown in FIG. 8 is output to the passing point predicting means 4 by the input means 2, the time point at which the detected coordinate point 103 is output is considered. At this time point, the detected coordinated point 103 is assumed to correspond to "present detected coordinate point", the detected coordinate point 102 is judged to correspond to "previous preceding detected coordinate point", and the detected coordinate point 101 is assumed to correspond to "two detected coordinate points before".

Each means (41 to 43) of the passing point predicting means 4 performs the following processing (see FIGS. 4 and 5).

First, when the control vector generating means 41 inputs the detected coordinate point 103 as the "present detected coordinated point" (step 501), the control vector generating means 41 generates an average speed vector and an average acceleration vector between the detected coordinate point 102 (previous preceding detected coordinate point) and the detected coordinate point 103 (step 502).

For example, in the case of FIG. 8, the average speed vector 200 is a vector having the half magnitude of a vector directing from the detected coordinate point 101 (two detected coordinate points before) to the detected coordinate point 103, and the average acceleration vector 201 is a differential vector between the average speed vector 200 and a vector directing from the detected coordinate point 102 to the detected coordinate point 103.

In order to display a smoothly curved line between the detected coordinate point 102 and the detected coordinate point 103, the insertion point number determining means 42 determines a desired insertion point number (the number of coordinate points to be inserted between the detected coordinate point 102 and the detected coordinate point 103) in accordance with the magnitude of the average acceleration vector 201 (for example, when the magnitude is large, the insertion point number is increased, and when the magnitude is small, the insertion point number is reduced) (step 503), and then outputs the insertion point number thus determined to the passing point adding means 43.

The passing point adding means 43 divides the average speed vector 200 into parts whose number is equal to the determined insertion point number to thereby generate a divisional coordinate point sequence 300 (step 504), and shifts each of the divisional coordinate points of the divisional coordinate point sequence 300 in the direction of the average acceleration vector 201 by a distance which is indicated by the processing means 5, thereby generating an interpolative coordinate point sequence 301 (step 505).

The "indication from the processing means 5" in step 505 is carried out to display a smooth curved line. For example, in the case of FIG. 8, on the basis of the indication from the processing means 5, "the distance at which each interpolative coordinate point of the interpolative coordinate point sequence 301 is shifted in the direction of the average acceleration vector 201", is varied in accordance with "the distance of each divisional coordinate point of the divisional coordinate point sequence 300 from the detected coordinate point 102", whereby the interpolative coordinate point sequence 301 is adjusted so as to draw a parabolic curve passing through the detected coordinate point 102 and the detected coordinate point 103.

The continuity judging means 44 judges whether the currently (presently) interpolated coordinate point sequence (the interpolative coordinate point sequence 301 between the detected coordinate point 102 and the detected coordinate point 103) and the existing (previously) interpolated coordinate point sequence (the interpolative coordinate point sequence between the detected coordinate point 101 and the detected coordinate point 102) are continuously linked to each other at the detected coordinate point 102 (step 506). This judgment is performed on the basis of the difference between the respective average speed vectors at each coordinate point (for example, the angular difference therebetween). For example, if the angular difference is large, the curved line is judged not to be smooth. On the other hand, if the angular difference is small, the curved line is judged to be smooth. On the basis of this judgment, it is judged whether the interpolative coordinate point sequence provides a smoothly curved line.

In accordance with the judgment result in step 506, the control vector generating means 41 alters (corrects) the method of calculating the average speed vector and the average acceleration vector which are generated at the input time of a next detected coordinate point (at the time point when the coordinate value of a new detected coordinate point is next obtained), if necessary (step 507). As an example of the content of the calculation to be altered, for example when the "average" in the average speed vector and the average acceleration vector is calculated, it may be considered to alter the range of a coordinate point sequence serving as a target for which the calculation of "average" is performed (i.e., an extraction range of the detected coordinate point sequence and the interpolative coordinate point sequence from which coordinate points should be extracted).

The above processing is repeated every time a detected coordinate point is obtained, and the same interpolative operation is performed between other neighboring detected coordinate points, whereby a smoothly curved line as indicated by a locus (locus after the interpolation) 400 is gradually generated by the interpolated coordinate point sequences.

The processing means 5 performs the processing for displaying on the display means 1 of the handwriting means 10 a curved line (as indicated by the locus 400) based on the coordinate point sequence which is received from the passing point adding means 43 in the passing point predicting means 4.

As describe above, according to the handwriting type input display device of this embodiment and thus of the present invention, the passing point predicting means 4 interpolates the detected coordinate point sequence, and thus the following effects (1) to (4) can be obtained.

(1) The locus of a pen can be displayed a smoothly and with a continuously handwritten curved line even by using the input means 2 having a long sampling interval, which samples a detected coordinate point at a fixed time (for example, every 1/100 second or 1/60 second) during the handwriting input operation.

(2) The average acceleration vector is increased in proportion to the variation of the speed and direction of the handwriting input operation. As described above, since the insertion point number determining means 42 determines the insertion point number in accordance with the average acceleration vector, the control of the insertion point number is performed so that the number of the interpolative coordinate points (insertion point number) is reduced when the variation of the handwriting input is small, and it is increased when the variation is large. Therefore, the interpolation can be efficiently performed. Actually, when a curved line is handwritten, the handwriting speed is higher as the variation (degree) of the curve is small while the handwriting speed is lower as the variation (degree) of the curve is large. Therefore, the method of this embodiment is very effective.

(3) The interpolative coordinate point sequence can be generated by merely performing an integer calculation of the coordinate values Therefore, for example, no function calculation such as a trigonometric function calculation, a decimal floating calculation or the like is needed. Thus, the calculation is easy for the operation of a CPU chip and achieves in short time, then the handwriting input and the response display on the handwriting means are simultaneously accomplished at real time. In addition, since the output of the interpolative result is a coordinate point sequence, no specific means is needed to display a curved line.

(4) The calculation method of generating passing points (interpolative coordinate point sequence) (an insertion method of coordinate points) is clearly indicated by the processing means 5. Therefore, it is possible to perform such an effective use mode like that the curve degree is varied in accordance with an application program.

Figure 10:
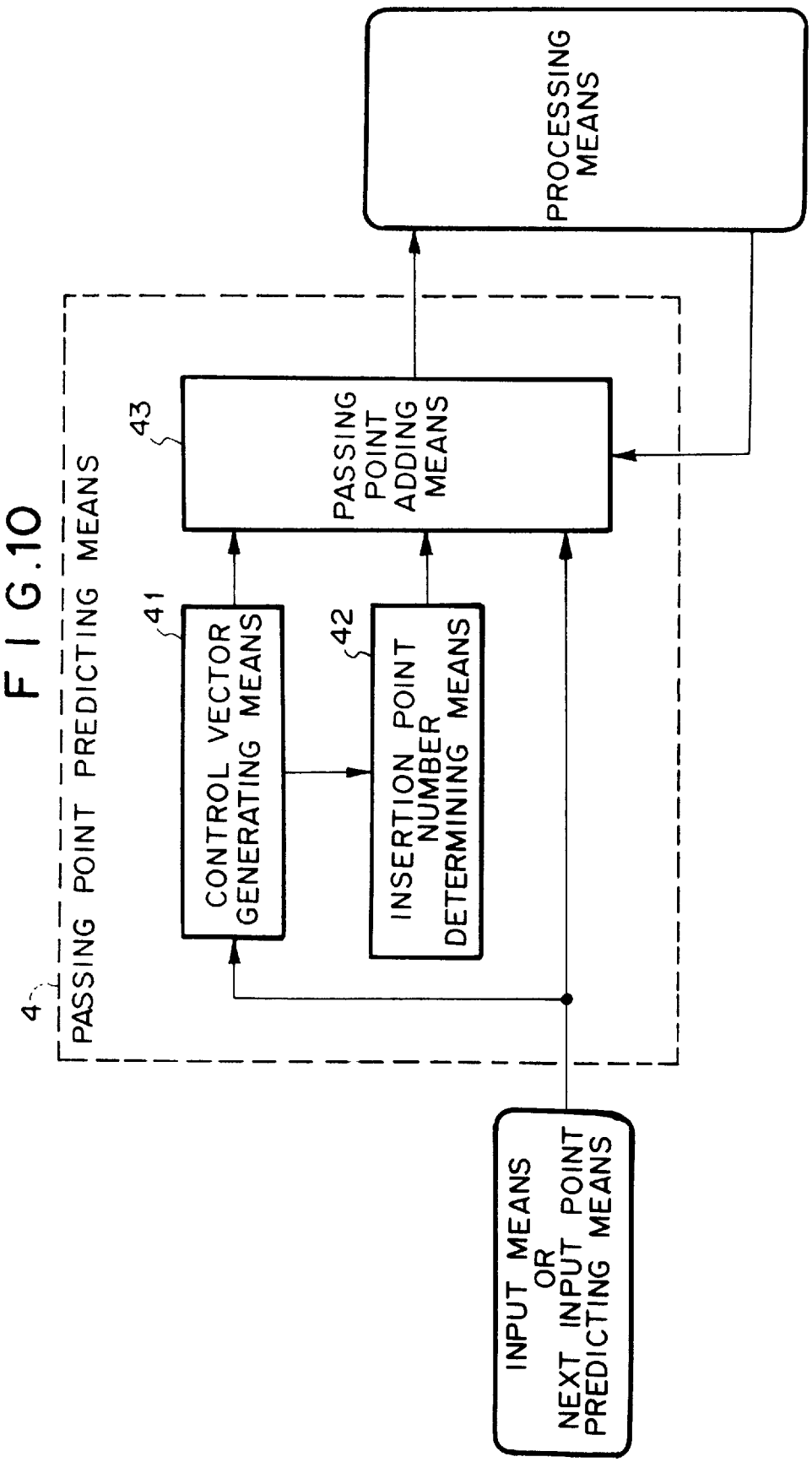
FIG. 10 is a diagram showing another embodiment of the passing point predicting means in FIGS. 1 and 3 (another embodiment of FIG. 4)

In this embodiment, the continuity judging means 44 is assumed to exist in the passing point predicting means 4. However, the passing point predicting means 4 may be designed to contain no continuity judging means 44 therein as shown in FIG. 10. In the case where the continuity judgment means 44 is provided, the continuity of the inserted interpolative coordinate point sequence can be judged by the continuity judging means 44 to adjust the operation of the control vector generating means 41, and thus there is an advantage that the follow-up performance of the response display of the display means 1 to the locus of the pen can be enhanced.

Furthermore, in the above embodiment, the interpolation method using the average acceleration vector is adopted to perform interpolation between the detected coordinate point sequence.

However, the interpolation method of the present invention is not limited to the above method, and another well-known interpolation system for a curved line may be used. Even when another interpolation system for a curved line is used, the same effect as the above-described embodiment can be expected. For example, the interpolating operation can be efficiently performed in accordance with the variation of the handwriting input even when an inexpensive input means 2 having a long sampling interval is used for the handwriting input.

SECOND EMBODIMENT

Figure 2:
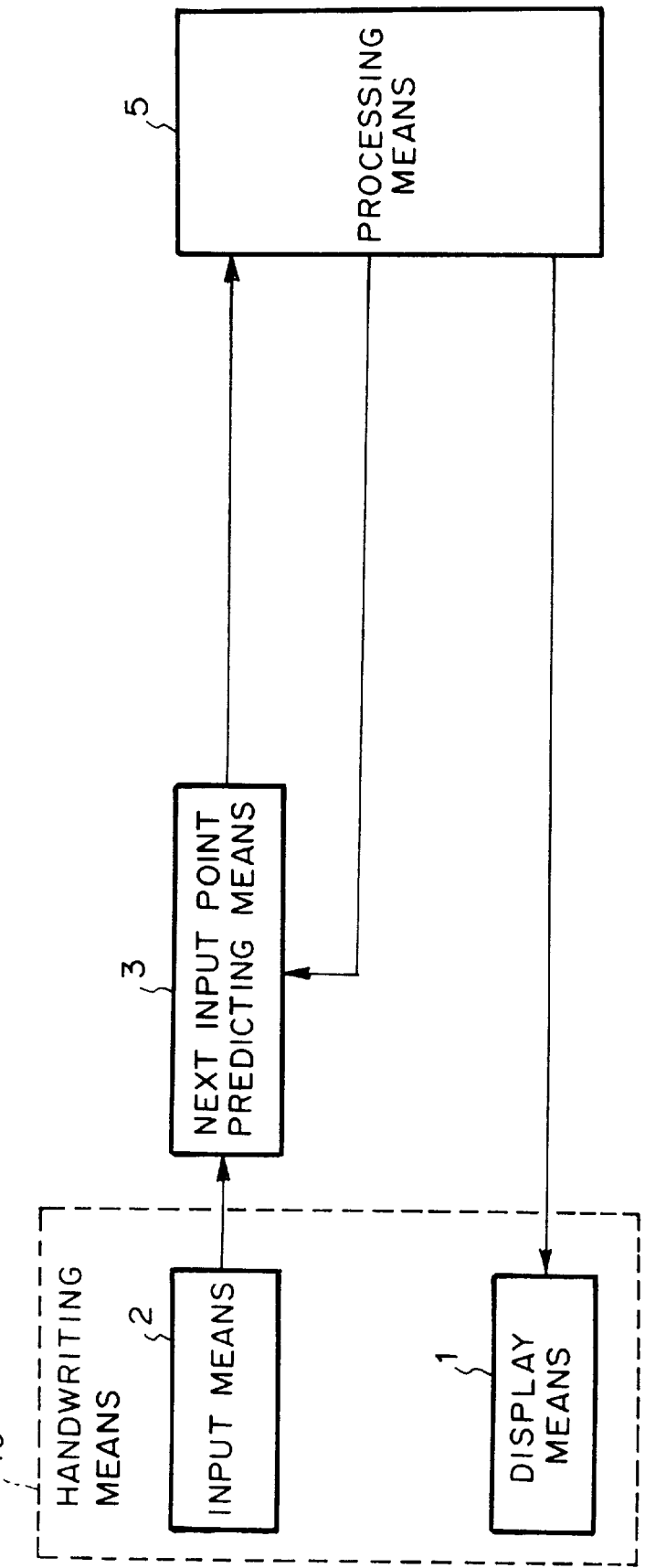
FIG. 2 is a block diagram showing the construction of a second embodiment of the present invention.

FIG. 2 is a block diagram showing the construction of a second embodiment of the handwriting type input display device according to the present invention.

The handwriting type input display device of this embodiment comprises display means 1, input means 2, next input point predicting means 3 and processing means 5. The display means 1 (which is realized by an LCD, for example) performs a twodimensional display. The input means 2 (which is realized by a touch panel, a pen input type tablet or the like) constitutes handwriting means 10 for achieving the "operability of paper and pen" in combination with the display means 1, and it serves to detect the handwriting input operation (the input operation of the coordinate point sequence) by a user at the coordinate position corresponding to a position on the screen of the display means 1 and output the input data to the next input point predicting means 3. In order to reduce the delay time from the time when the user carries out the handwriting input operation until the time when the response display is actually performed, the next input point predicting means 3 generates a predicted coordinate point (a coordinate point which is predicted to be detected by the input means 2 after the delay time elapses) corresponding to each coordinate point received from the input means 2, and outputs the predicted coordinate point to the processing means 5. The processing means 5 performs the processing of indicating the calculation method for generating the predicted coordinate point to the next input point predicting means 3 to display on the display means 1 a curved line based on the coordinate point sequence which is obtained from the next input point predicting means 3.

Figure 6:
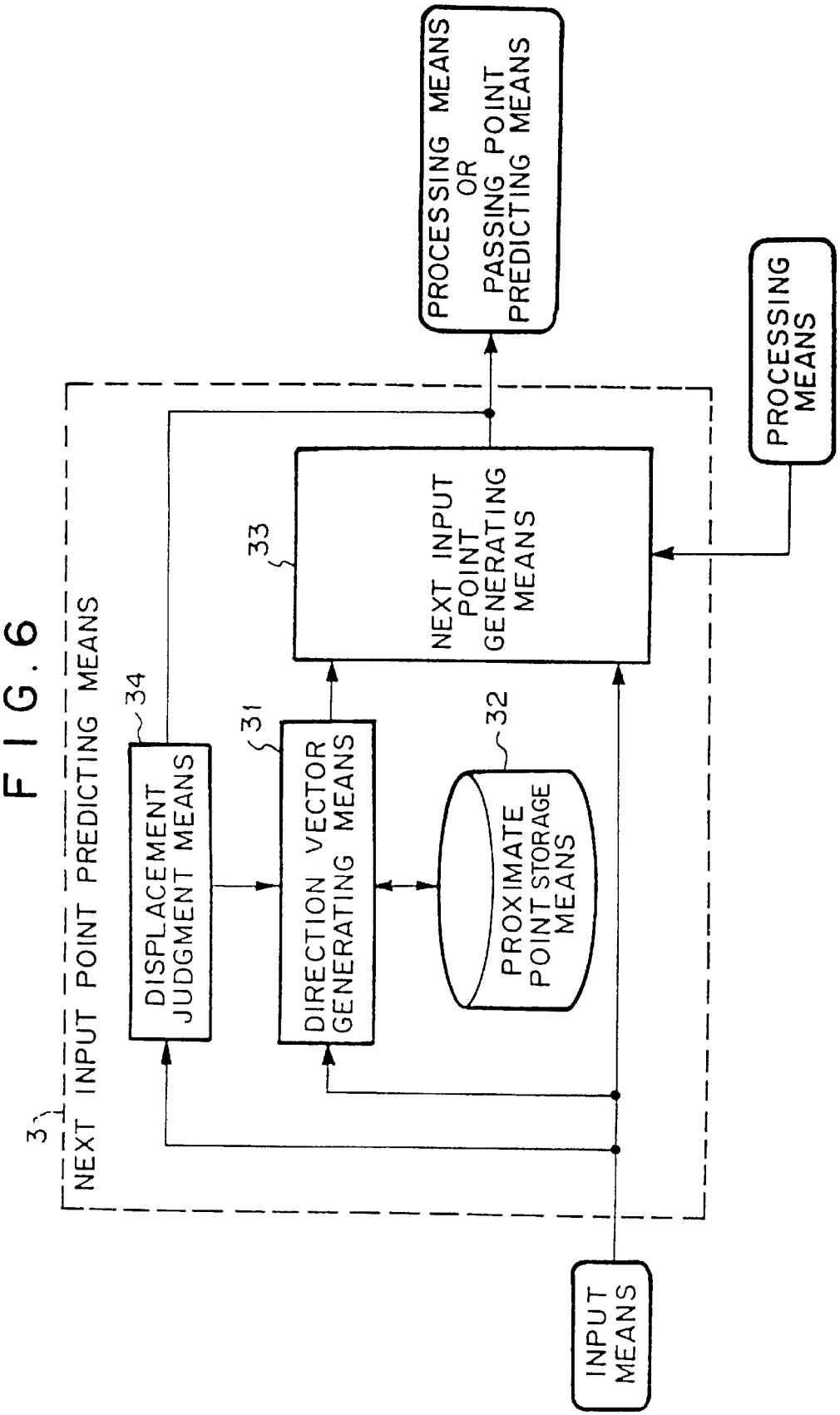
FIG. 6 is a block diagram showing the construction of next input point predicting means in FIGS. 2 and 3.

FIG. 6 is a block diagram showing the construction of the next input point predicting means 3 in the handwriting type input display device of this embodiment ("the processing means 5 or the passing point predicting means 4" in FIG. 6 means "the processing means 5" in this embodiment). Referring to FIG. 6, the next input point predicting means 3 has the following constituent elements (1) to (4) (direction vector generating means 31, proximate point storage means 32, position error (displacement) judging means 34 and next input point generating means 33).

(1) The direction vector generating means 31 stores the latest coordinate point of a coordinate point sequence received from the input means 2 into a proximate point storage means 32, generates a speed vector and an acceleration vector at the latest coordinate point on the basis of a proximate coordinate point sequence which is read out from the proximate point storage means 32 (this generation processing is performed in consideration of the detection result of position error judging means 34 as described later), and then outputs the vector concerned to the next input point generating means 33.

(2) The proximate point storage means 32 stores a predetermined coordinate point sequence and a coordinate point sequence or the like which can become a proximate coordinate point for the latest coordinate point in according to be indicated by the direction vector generating means 31.

(3) In accordance with the instruction from the processing means 5, the next input point generating means 33 enlarges or reduces the magnitude of the composite vector of the speed vector and the acceleration vector at the latest coordinate point to generate a shift vector, shifts the latest coordinate point in the direction of the shift vector by the magnitude of the shift vector to generate a predicted coordinate point, and then outputs the predicted coordinate point to the processing means 5.

(4) The position error (displacement) judging means 34 detects the position error in coordinate position between the predicted coordinate point and a newly obtained (detected) coordinate point (in accordance with the position error), the direction vector generating means 31 performs a predetermined correction on the speed vector (also, the acceleration vector) which is next generated).

Figure 7:
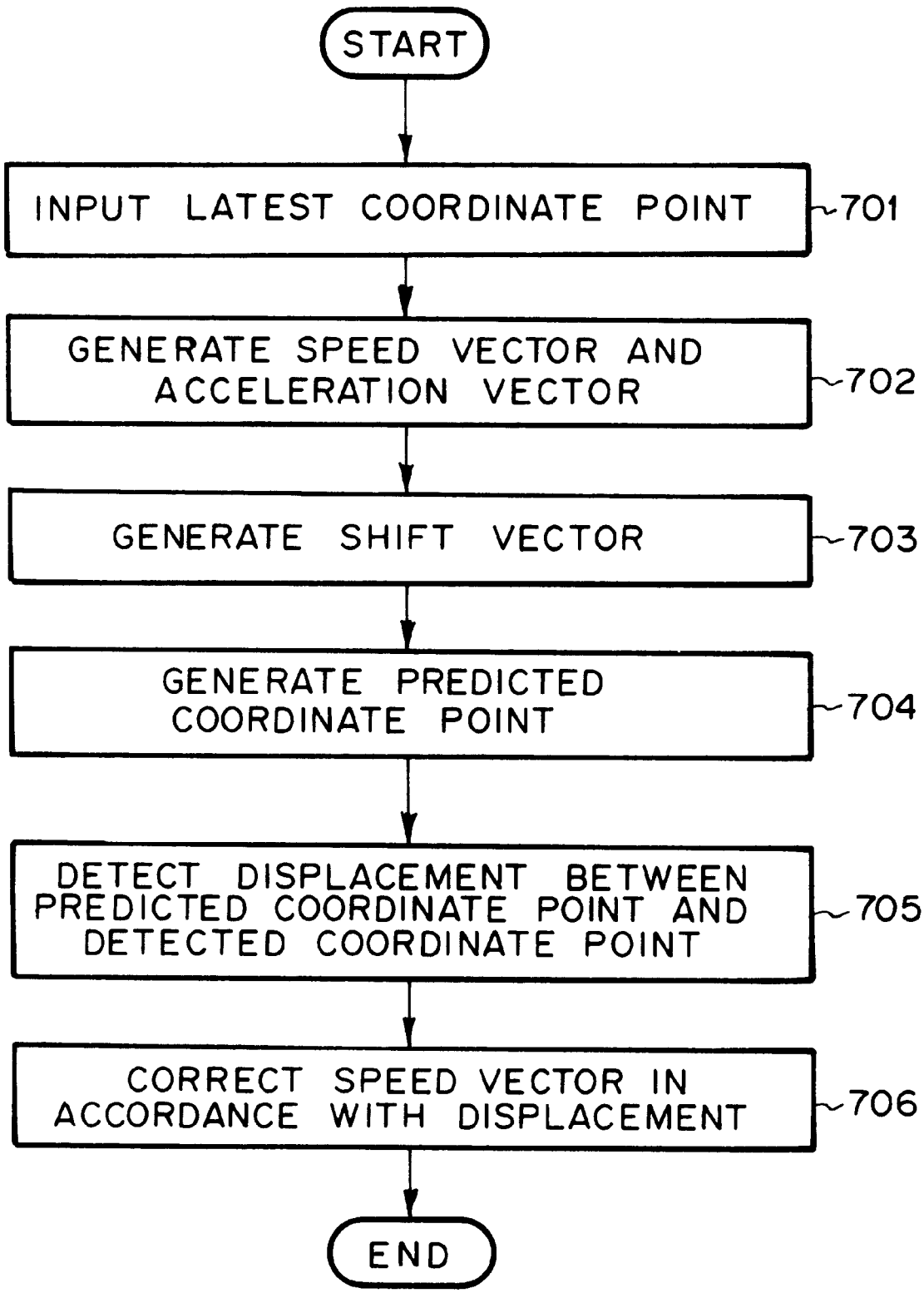
FIG. 7 is a flowchart showing the processing in the next input point predicting means shown in FIG. 6.

FIG. 7 is a flowchart showing the processing by the next input point predicting means 3 shown in FIG. 6. This processing comprises a latest coordinate point input step 701, a speed vector and acceleration vector generating step 702, a shift vector generating step 703, a predicted coordinate point generating step 704, a position error (displacement) detection step 705, and a speed vector correction step 706.

Figure 9:
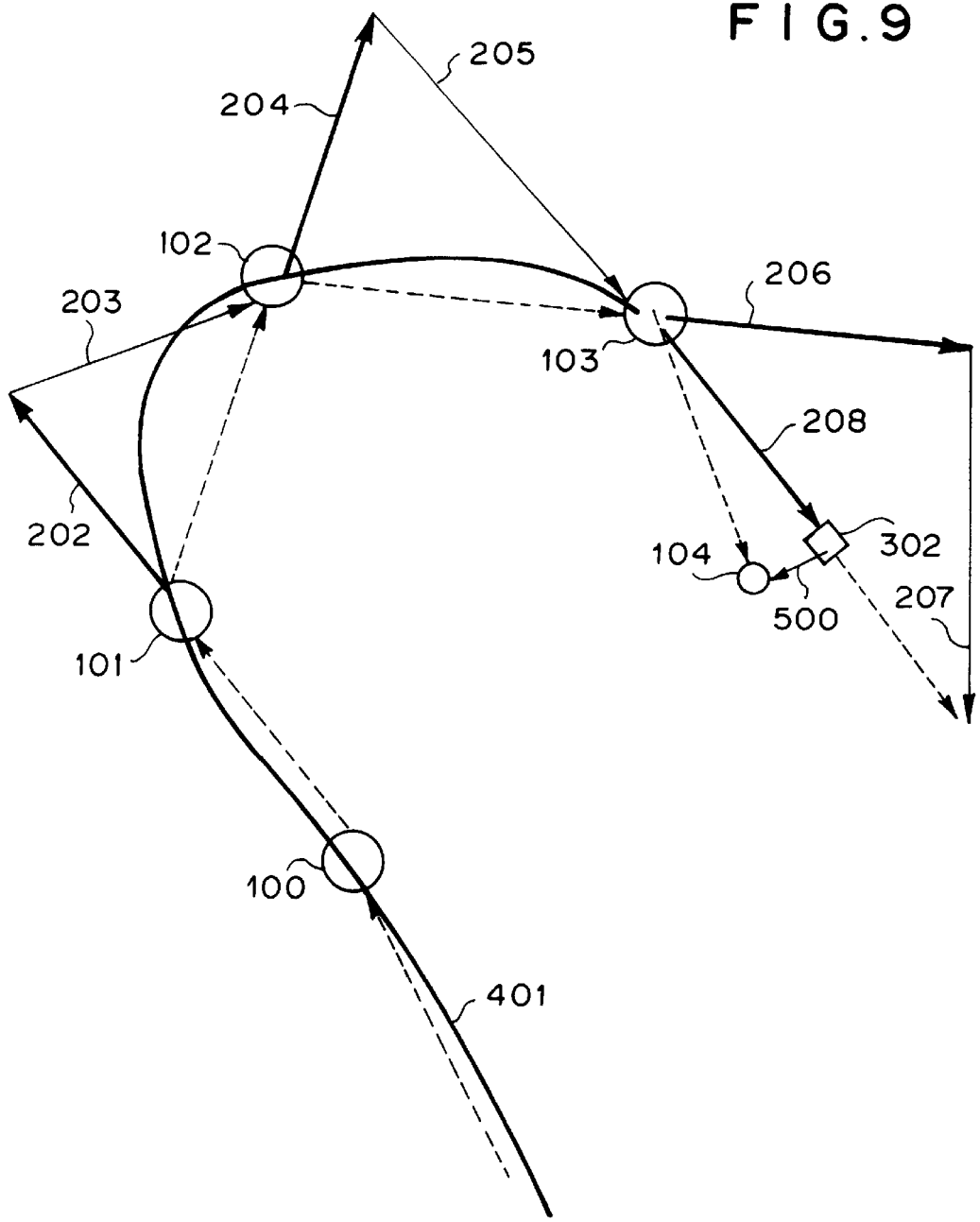
FIG. 9 is a schematic diagram showing the operation of the handwriting type input display device shown in FIGS. 2 and 3, and particularly it is a diagram showing the operation of the next input point predicting means shown in FIG. 6.

FIG. 9 is a schematic diagram showing the operation of the hand writing input display device of this embodiment. In FIG. 9, a detected coordinate point 100, a detected coordinate point 101, a detected coordinate point 102, a detected coordinate point 103 and a detected coordinate point 104 are obtained by arranging a coordinate point sequence detected by the input means 2 in a detection order. The speed and the acceleration at each coordinate point are represented by a speed vector 202 and an acceleration vector 203 at the detected coordinate point 101, by a speed vector 204 and an acceleration vector 205 at the detected coordinate point 102, and by a speed vector 206 and an acceleration vector 207 at the detected coordinate point 103. The predicted coordinate point 302 is the predicted coordinate point corresponding to the shift vector 208 at the detected coordinate point 103. The position error 500 represents the position error between the detected coordinate point 104 really obtained after the prediction and the predicted coordinate point 302.

Next, the operation of the handwriting type input display device of this embodiment will be described with reference to FIGS. 2, 6, 7 and 9.

The input means 2 in the handwriting means 10 successively inputs a coordinate point sequence which is indicated by a user, and outputs each coordinate point (the coordinate value of each coordinate point) to the next input point predicting means 3.

In the following description, the time point when the detected coordinate point 103 is output (at this time point, the detected coordinate point 103 corresponds to "the latest coordinate point" with respect to the processing of the coordinate point sequence) and the time point when the detected coordinate point 104 is output, are considered in the process of outputting the detected coordinate point sequence shown in FIG. 9 to the next input point predicting means 3 by the input means 2.

Each means of the next input point predicting means 3 performs the following processing (see FIGS. 6 and 7).

When inputting the detected coordinate point 103 as "the latest coordinate point" (step 701), the direction vector generating means 31 generates the speed vector 206 and the acceleration vector 207 at the detected coordinate point 103 on the basis of the proximate coordinate point sequence read out from the proximate point storage means 32 (the past coordinate point sequence proximate to the latest coordinate point) (step 702).

For example, in the case of FIG. 9, the speed vector 206 is a vector directing from the detected coordinate point 102 to the detected coordinate point 103, and the acceleration vector 207 is a differential vector between the acceleration vector 205 and the acceleration vector 203.

The detected coordinate point 103 which is the latest coordinate point is stored in the proximate point storage means 32 by the direction vector generating means 31 because it is used as a coordinate point in a next process of generating a proximate coordinate point sequence for a detected coordinate point.

Subsequently, the next input point generating means 33 reduces or enlarges the composite vector of the speed vector 206 and the acceleration vector 207 in accordance with an instruction from the processing means 5 (an instruction specifying the calculation method for generating a predicted coordinate point) to generate the shift vector 208 (step 703), shifts the detected coordinate point 103 in the direction of the shift vector 208 by the magnitude of the shift vector 208 to generate the predicted coordinate point 302 (step 704), and then outputs the predicted coordinate point 302 to the processing means 5.

For example, in the case of FIG. 9, the composite vector of the speed vector 206 and the acceleration vector 207 is reduced to a predetermined distance at which the pen is movable during the delay time of the response display, and the reduction rate, etc. are indicated by the processing means 5, then the composite vector generates the shift vector 208. In the case of FIG. 9, the composite vector of the speed vector and the acceleration vector is "reduced" to generate the shift vector. However, the composite vector may be "enlarged" in other case.

At the time point when the detected coordinate point 104 (the coordinate point which is detected subsequently to the detected coordinate point 103 by the input means 2) is input, the position error (displacement) judging means 34 detects the position error 500 between the predicted coordinate point 302 and the detected coordinate point 104 (step 705), and outputs the position error (displacement) 500 to the direction vector generating means 31.

The direction vector generating means 31 corrects the speed vector for the detected coordinate point 104 in accordance with the position error 500 in order to accurately calculate the predicted coordinate (the coordinate value of the predicted coordinate point at the detected coordinate point 104) at the time point when a next coordinate point (the detected coordinate point 104) after the prediction of the predicted coordinate point 302 is obtained (step 706).

The processing as described above is repeated every time the detected coordinate point is obtained (the execution time of the processing of the steps 701 to 704 and the execution time of the processing of the steps 705 to 706 are deviated from each other by the time corresponding to one detected coordinate point for the input of the detected coordinate point), and the predicted coordinate points for the other detected coordinate points are obtained in the same manner as described above, whereby a curved line as indicated as the locus 401 is gradually formed by the predicted coordinate point sequence thus obtained.

The processing means 5 performs the processing of displaying on the display means 1 of the handwriting means 10 a curved line (a curved line like the locus 401) based on the coordinate point sequence which is received from the next input point generating means 33 in the next input point predicting means 3.

As described above, according to the handwriting type input display device of this embodiment, and thus the present invention, a coordinate point which is predicted to be detected by the input means 2 after the delay time of the response display, that is, a predicted coordinate point is generated by the next input point predicting means 3, so that the following effects (1) to (3) can be obtained:

(1) it is possible to reduce the delay time from the time when the user performs his handwriting input operation until the time when the response display thereto is performed;

(2) since the predicted coordinate point can be generated by shifting the latest coordinate point in the direction of the shift vector which is generated from. the speed vector and the acceleration vector for the latest coordinate point, the reduction of the delay time of the response display to the handwriting input operation can be performed by only the integer calculation of the coordinate values together with the achievement of the effect (1) as described above; and (3) since the calculation method for generating the predicted coordinate point can be clearly indicated by the processing means 5, there can be used such an efficient way that the coordinate prediction can be varied in accordance with an application program to be used.

In the above embodiment, the position error judging means 34 is assumed to exist in the next input point predicting means 3. However, the next input point predicting means 3 may be designed so that no position error judging means 34 exists therein as shown in FIG. 11. In the case where the position error judging means 34 is provided, the position error between a predicted coordinate point and a detected coordinate point which is newly obtained after the prediction can be detected and judged by the position error judging means 34, and the direction vector generating means 31 can alter the calculation method of the speed vector in accordance with the detection result to reduce the position error. Therefore, there is obtained an advantage that the follow-up of the response display on the display means 1 to the locus of the pen can be enhanced.

THIRD EMBODIMENT

Figure 3:
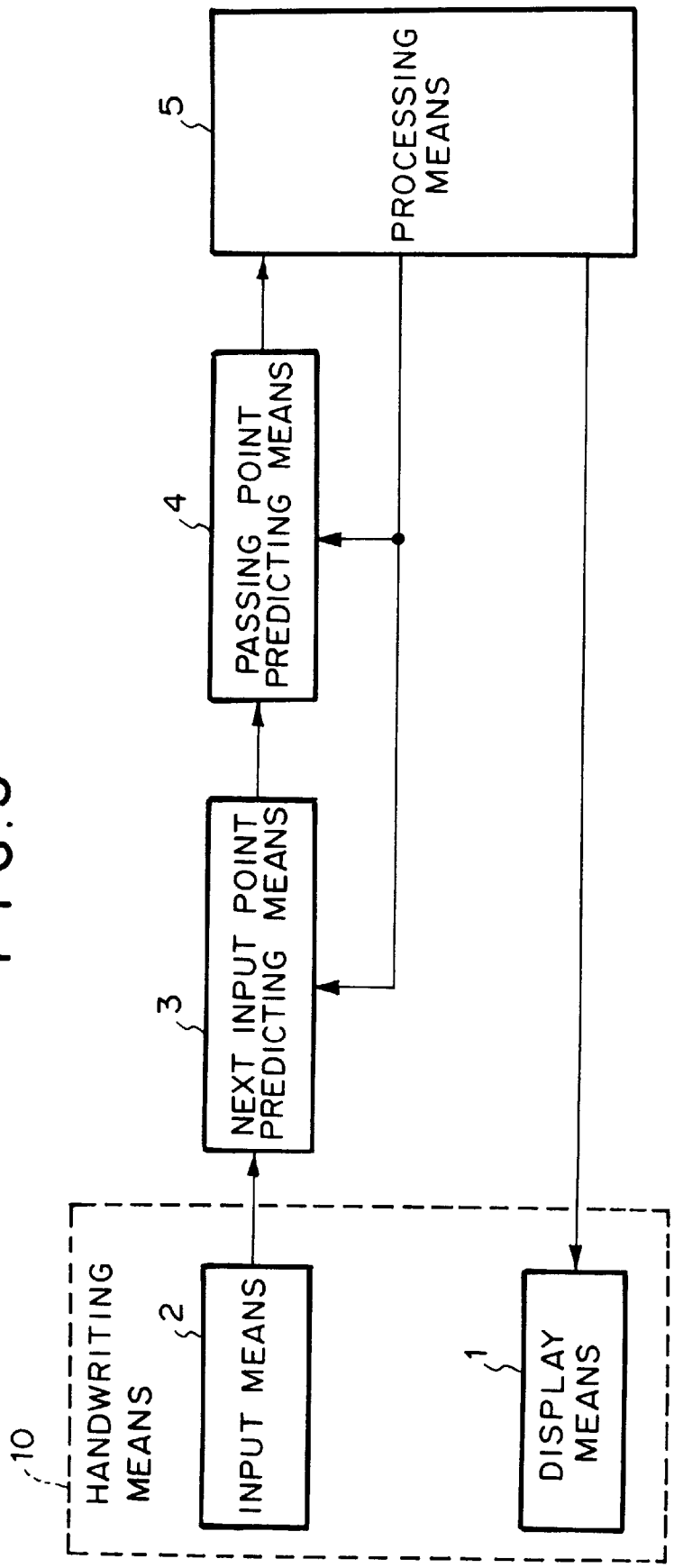
FIG. 3 is a block diagram showing the construction of a third embodiment of the present invention.

FIG. 3 is a block diagram showing the construction of a third embodiment of the handwriting type input display device according to the present invention.

The handwriting input display of the third embodiment comprises display means 1 which is realized by an LCD, for example, input means 2 which is realized by a touch panel or a pen input type tablet, for example, next input point predicting means 3, passing point predicting means 4 and processing means 5. In this case, the display means 1 and the input means 2 constitute handwriting means 10 in combination.

The next input point predicting means 3 is designed as shown in FIG. 6. In FIG. 6, "the processing means 5 or the passing point predicting means 4" means "the passing point predicting means 4" in this embodiment. In place of the construction shown in FIG. 6, the construction as shown in FIG. 11 may be adopted like the second embodiment.

The passing point predicting means 4 is designed as shown in FIG. 4. In FIG. 4, "the input means 2 or the next input point predicting means 3" means "the next input point predicting means 3" in this embodiment. In place of the construction shown in FIG. 4, the construction as shown in FIG. 10 may be adopted like the first embodiment.

Like the first embodiment, the handwriting type input display device of this embodiment can represent a locus of a pen with a smoothly and continuously handwritten curved line even by using the input means 2 having a long sampling interval because the passing point predicting means 4 performs the interpolation of the coordinate point sequence.

Further, like the second embodiment, the handwriting type input display device of this embodiment can reduce the delay time from the handwriting input time of the user until the response display time because the next input point predicting means 3 generates a coordinate point which is predicted to be detected by the input means 2 after the delay time of the response display.

Still further, according to the handwriting type input display device of this embodiment, both the next input point predicting means 3 and the passing point predicting means 4 are provided, and thus the following inherent effects (1) and (2) are obtained.

(1) The processing means 5 can instruct to alter the calculation method for the generation of the predicted coordinate point by the next input point predicting means 3 in accordance with the locus of the pen which is reproduced as accurately as possible by the interpolation of the passing point predicting means 4. For example, in the generation of the predicted coordinate point 302 in FIG. 9, it is considered. In this case, the processing means 5 can instruct the next input point generating means 33 to correct the speed vector 206 generated by the direction vector generating means 31 of the next input point predicting means 3 in accordance with the speed vector of the interpolative coordinate point sequence of the detected coordinate point 102 and the detected coordinate point 103, which is interpolated by the passing point predicting means 4, whereby the predicted coordinate points which are closer to the actual locus of the pen can be generated by that the calculation of the predicted coordinate points can be performed.

(2) If the interpolation of the coordinate point sequence by the passing point predicting means 4 is applied to an area between the latest coordinate point and a predicted coordinate point which is predicted for the latest coordinate point by the next input point predicting means 3, the generation of a more accurate predicted coordinate point by the calculation of a predicted coordinate can be performed. Even when the calculation method of the predicted coordinate points is altered in accordance with the position error, the prediction coordinate points can be accurately calculated in accordance with the locus of the pen. For example, in the case of the generation of the shift vector 208 and the predicted coordinate point 302, it is considered. In this case, the shift vector 208 is generated by reducing the composite vector of the speed vector 206 and the acceleration vector 207, and the predicted coordinate point 302 is generated by shifting the detected coordinate point 103 in direction/magnitude of the shift vector 208. When the predicted coordinate points are generated as described above, the predicted coordinates which are further closer to the actual locus of the pen could be calculated by applying the interpolation of the coordinate point sequence of the passing point predicting means 4 and setting as a predicted coordinate point a coordinate point in the interpolated coordinate point sequence which is interpolated by the passing point predicting means 4.

As described above, each of the next input point predicting means 3 and the passing point predicting means 4 inputs a coordinate point sequence and then outputs a coordinate point sequence, and thus these means can be easily combined with each other. By combining the functions of these means, the inherent effects (1) and (2) as described above can be achieved, so that the coordinate prediction and the curved-line display based on the coordinate prediction can be performed at higher speed and with higher reliability.

As described above, according to the handwriting type input display device of the present invention, the following effects can be obtained by providing the passing point predicting means and/or the next input point predicting means:

(A) Effects obtained by interpolating a coordinate point sequence by the passing point predicting means (1) The locus of the pen can be represented by a smooth and continuous handwrite-like curved line even when the input means having a long sampling interval is used, and thus the operation load imposed on the user can be reduced, so that the operation efficiency of the user can be enhanced.

(2) The control operation of the number of interpolative points can be performed so that when the variation of the handwriting input is less, the number of interpolative points is set to a smaller value while when the variation of the handwriting input is larger, the number of interpolative points is set to a larger value. Therefore, the efficient interpolation can be performed.

(3) The generation of the interpolative coordinate point sequence can be performed by only the integer calculation of coordinate values, and no special means like as a trigonometric function calculation, a decimal calculation, and a decimal floating calculation is needed for the display of curved lines because the output target is a coordinate point sequence. Accordingly, even when a terminal having a low processing capacity and a low price is used, a response display which accurately follows the locus of a pen can be achieved.

(4) Since the calculation method of generating an interpolative coordinate point sequence and the insertion method of coordinate points can be clearly instructed by the processing means, so that there can be used such an efficient way that the coordinate prediction can be varied in accordance with an application program to be used.

(5) If the continuity judgment means is provided, the continuity judgment means judges the continuity of an inserted coordinate point sequence to adjust the operation of the control vector generating means, so that the follow-up of the response display to the locus of the pen can be enhanced.

(B) Effects obtained by generating predicted coordinate points by the next input point predicting means (1) The delay time from the handwriting input time by the user until the response display time can be reduced, and the operational load on the user can be reduced.

(2) The predicted coordinate point can be generated by merely shifting the latest coordinate point in the direction of the shift vector which is generated on the basis of the speed vector and the acceleration vector for the latest coordinate point. Therefore, the delay of the response display to the handwriting input operation can be reduced by only the integer calculation of the coordinate values without wasting the processing time.

(3) Since the calculation method of generating the predicted coordinate point can be clearly instructed by the processing means, there can be used such an efficient way that the coordinate prediction can be varied in accordance with an application program to be used.

(4) In the case where the position error judging means is provided, the position error (displacement) between a predicted coordinate point and a detected coordinate point which is newly obtained after the prediction can be detected and judged by the position error (displacement) judging means, and the direction vector generating means 31 can alter the calculation method of the speed vector in accordance with the detection result to reduce the position error. Accordingly, the follow-up of the response display of the display means to the locus of the pen can be enhanced.

(C) Effects obtained by providing both the passing point predicting means and the next input point predicting means (1) Both the passing point predicting means and the next input point predicting means serve to input a coordinate point sequence and then output a coordinate point sequence, and thus they can be easily combined with each other. By combining the functions of these means, the high-speed coordinate prediction can be performed with high reliability.

(2) Specifically, the calculation method for generating the predicted coordinate points by the next input point predicting means can be appropriately altered in accordance with the locus of the pen and the locus of the pen based on the interpolated coordinate point sequence is accurately reproduced by the interpolating operation of the passing point predicting means. Further, the generation of more accurate predicted coordinate points by the calculation of the predicted coordinates can be performed by applying the interpolation of the coordinate point sequence by the passing point predicting means between the latest coordinate point and a predicted coordinate point which is predicted for the latest coordinate point by the next input point predicting means. By the curved line display based on the predicted coordinate points, a locus display of a curved line can be performed with no error on a real time basis with no delay time.

While this invention has been particularly shown and described with reference to the preferred embodiment thereof, it will be understood that various changes in form and details may be made therein without departing from the spirit and scope of the invention.

What is claimed is:

1. A handwriting type input display device comprising:

display means for performing a two-dimensional display;

input means which constitutes handwriting means in combination with said display means, and is adapted to detect a handwriting input operation by a user at a coordinate position corresponding to a position on a screen of said display means;

passing point predicting means for receiving the coordinate point sequence from said input means to insert a new coordinate point sequence between neighboring coordinate points of the coordinate point sequence, and outputting a coordinate point sequence for forming a smooth handwritten curved line;

processing means for instructing an insertion method of coordinate points to said passing point predicting means, and performing processing of displaying on said display means a curved line based on the coordinate point sequence which is obtained by said passing point predicting means; and wherein said passing point predicting means comprises control vector generating means for generating an average speed vector and an average acceleration vector on two neighboring coordinate points of the received coordinate point sequence.

insertion point number determining means for determining the number of insertion points between the two neighboring coordinate points on the basis of the magnitude of the average acceleration vector generated by said control vector generating means.

2. The handwriting type input display device as claimed in claim 1, wherein said passing point predicting means further comprises:

passing point adding means for dividing the average speed vector generated by said control vector generating means into parts whose number is equal to the insertion point number determined by said insertion point number determining means to generate a divisional coordinate point sequence, and shifting the divisional coordinate point sequence in the direction of the average acceleration vector in accordance with an instruction of said processing means.

3. The handwriting type input display device as claimed in claim 2, wherein said passing point predicting means has continuity judgment means for judging whether the interpolative coordinate point sequence received from said passing point adding means forms a smoothly curved line, and said control vector generating means in said passing point predicting means corrects the calculation of the average speed vector and the average acceleration vector in accordance with the judgment result of said continuity judgment means.

4. A handwriting type input display device comprising:

display means for performing a two-dimensional display;

input means which constitutes handwriting means in combination with said display means, and is adapted to detect a handwriting input operation by a user at a coordinate position corresponding to a position on a screen of said display means;

next input point predicting means for generating predicted coordinate points for each coordinate point which is received from said input means to reduce a delay time from the time when a user performs a handwriting input operation until the time when a response display is performed;

passing point predicting means for receiving the coordinate point sequence from said next input point predicting means to insert a new coordinate point sequence between neighboring coordinate points of the coordinate point sequence, and outputting a coordinate point sequence for forming a smooth handwritten curved line;

processing means for instructing a calculation method for generating the predicted coordinate points to said next input point predicting means, and performing processing of displaying on said display means a curved line based on a coordinate point sequence which is obtained from said next input point predicting means; and wherein said passing point predicting means comprises control vector generating means for generating an average speed vector and an average acceleration vector on two neighboring coordinate points of the received coordinate point sequence, insertion point number determining means for determining the number of insertion points between the two neighboring coordinate points on the basis of the magnitude of the average acceleration vector generated by said control vector generating means.

5. The handwriting type input display device as claimed in claim 4, wherein said next input point predicting means comprises:

proximate point storage means for storing a coordinate point sequence which is to be a proximate coordinate point sequence to the latest coordinate point;

direction vector generating means for reading out the proximate coordinate point sequence to the latest coordinate point from said proximate point storage means to generate a speed vector and an acceleration vector at the latest coordinate point from the proximate coordinate point sequence; and next input point generating means for correcting the composite vector of the speed vector and the acceleration vector generated by said direction vector generating means in accordance with an instruction of said processing means to generate a shift vector, and shifting the latest coordinate point in the direction of the shift vector to generate a predicted coordinate point.

6. The handwriting type input display device as claimed in claim 5, wherein said next input point predicting means has position error judging means for detecting the position error in coordinate position between the predicted coordinate point generated by said next input point generating means and a coordinate point which is newly obtained after the prediction, and said direction vector generating means in said next input point predicting means corrects the calculation of the speed vector and the acceleration vector in accordance with the position error detected by said position error judging means.

7. A handwriting type input display device comprising:

display means for performing a two-dimensional display;

input means which constitutes handwriting means in combination with said display means, and is adapted to detect a handwriting input operation by a user at a coordinate position corresponding to a position on a screen of said display means;

next input point predicting means for generating predicted coordinate points for each coordinate point which is received from said input means to reduce a delay time from the time when a user performs a handwriting input operation until the time when a response display is performed;

passing point predicting means for receiving the coordinate point sequence from said next input point predicting means to insert a new coordinate point sequence between neighboring coordinate points of the coordinate point sequence, and outputting a coordinate point sequence for forming a smooth handwritten curved line;

processing means for instructing a calculation method for generating the predicted coordinate points to said next input point predicting means, instructing an insertion method of a coordinate point to said passing point predicting means, and performing processing of displaying on said display means a curved line based on a coordinate point sequence obtained from said passing point predicting means; and wherein said passing point predicting means comprises control vector generating means for generating an average speed vector and an average acceleration vector on two neighboring coordinate points of the received coordinate point sequence, insertion point number determining means for determining the number of insertion points between the two neighboring coordinate points on the basis of the magnitude of the average acceleration vector generated by said control vector generating means.

8. The handwriting type input display device as claimed in claim 7, wherein said passing point predicting means further comprises:

passing point adding means for dividing the average speed vector generated by said control vector generating means into parts whose number is equal to the insertion point number determined by said insertion point number determining means to generate a divisional coordinate point sequence, and shifting the divisional coordinate point sequence in the direction of the average acceleration vector in accordance with an instruction of said processing means.

9. The handwriting type input display device as claimed in claim 8, wherein said passing point predicting means has continuity judgment means for judging whether the interpolative coordinate point sequence received from said passing point adding means forms a smoothly curved line, and said control vector generating means in said passing point predicting means corrects the calculation of the average speed vector and the average acceleration vector in accordance with the judgment result of said continuity judgment means.

10. The handwriting type input display device as claimed in claim 7, wherein said next input point predicting means comprises:

proximate point storage means for storing a coordinate point sequence which is to be a proximate coordinate point sequence to the latest coordinate point;

direction vector generating means for reading out the proximate coordinate point sequence to the latest coordinate point from said proximate point storage means to generate a speed vector and an acceleration vector at the latest coordinate point from the proximate coordinate point sequence; and next input point generating means for correcting the composite vector of the speed vector and the acceleration vector generated by said direction vector generating means in accordance with an instruction of said processing means to generate a shift vector, and shifting the latest coordinate point in the direction of the shift vector to generate a predicted coordinate point.

11. The handwriting type input display device as claimed in claim 7, wherein said next input point predicting means has position error judging means for detecting the position error in coordinate position between the predicted coordinate point generated by said next input point generating means and a coordinate point which is newly obtained after the prediction, and said direction vector generating means in said next input point predicting means corrects the calculation of the speed vector and the acceleration vector in accordance with the position error detected by said position error judging means.

* * * * *